US008368675B2

(12) United States Patent
Park et al.

(10) Patent No.: US 8,368,675 B2
(45) Date of Patent: Feb. 5, 2013

(54) ORGANIC LIGHT EMITTING DISPLAY DEVICE

(75) Inventors: Dong-Wook Park, Suwon-si (KR); Se-Ho Kim, Suwon-si (KR); Jung-Keun Ahn, Suwon-si (KR); Han-Sung Bae, Suwon-si (KR); Dong-Hwi Kim, Suwon-si (KR); Chang-Yeop Kim, Suwon-si (KR); Ok-Kyung Park, Suwon-si (KR); Kwang-Min Kim, Suwon-si (KR)

(73) Assignee: Samsung Display Co., Ltd., Giheung-Gu, Yongin, Gyeonggi-Do (KR)

(*) Notice: Subject to any disclaimer, the term of this patent is extended or adjusted under 35 U.S.C. 154(b) by 598 days.

(21) Appl. No.: 12/585,610

(22) Filed: Sep. 18, 2009

(65) Prior Publication Data

US 2010/0110050 A1 May 6, 2010

(30) Foreign Application Priority Data

Nov. 4, 2008 (KR) ........................ 10-2008-0108935

(51) Int. Cl.
*G06F 3/038* (2006.01)

(52) U.S. Cl. ........................................................ 345/205

(58) Field of Classification Search ......................... None
See application file for complete search history.

(56) References Cited

U.S. PATENT DOCUMENTS

| | | | | |
|---|---|---|---|---|
| 7,910,919 | B2 * | 3/2011 | Yang et al. | 257/40 |
| 2002/0057610 | A1 * | 5/2002 | Baliga | 365/200 |
| 2007/0024541 | A1 * | 2/2007 | Ryu et al. | 345/76 |
| 2008/0032431 | A1 * | 2/2008 | Hsu et al. | 438/29 |
| 2008/0079685 | A1 * | 4/2008 | Umezaki et al. | 345/100 |
| 2008/0252203 | A1 * | 10/2008 | Lee | 313/504 |
| 2009/0026454 | A1 * | 1/2009 | Kurokawa et al. | 257/59 |
| 2009/0121973 | A1 * | 5/2009 | Kim et al. | 345/55 |

FOREIGN PATENT DOCUMENTS

| | | |
|---|---|---|
| KR | 1020000050877 A | 8/2000 |
| KR | 1020050020699 A | 3/2005 |
| KR | 1020060099319 A | 9/2006 |
| KR | 100658292 | 12/2006 |

* cited by examiner

*Primary Examiner* — Joseph Haley
*Assistant Examiner* — Henok Heyi
(74) *Attorney, Agent, or Firm* — Robert E. Bushnell, Esq.

(57) ABSTRACT

An organic light emitting display device comprising: a data driver supplying data signals to data output lines; a scan driver supplying scan signals sequentially to scan output lines; a light emitting control line driver supplying light emitting control signals to light emitting control output lines; and a pixel unit including a plurality of pixels connected to the output lines of each driver, at least one driver having a buffer circuit disposed at each output line. Each buffer circuit comprises a transistor having a gate layer, source and drain layers and a metal layer for shielding Electro-Static Discharge (ESD), wherein the metal layer is formed over the gate layer when the gate layer is overlapped by one of the source or a drain electrodes, or the metal layer is formed to not overlap the gate layer when the gate layer is not overlapped by the source or a drain electrodes.

13 Claims, 3 Drawing Sheets

ORGANIC LIGHT EMITTING DISPLAY DEVICE

CLAIM FOR PRIORITY

This application makes reference to, incorporates the same herein, and claims all benefits accruing under 35 U.S.C. §119 from an application entitled ORGANIC LIGHT EMITTING DISPLAY DEVICE earlier filed in the Korean Industrial Property Office on 4 Nov. 2008, which was duly assigned Serial No. 10-2008-0108953 by that Office.

BACKGROUND OF THE INVENTION

1. Field of the Invention

The present invention relates to an organic light emitting display device, and more particularly to an organic light emitting display device minimizing parasitic capacitance existing in an output terminal of a driver.

2. Discussion of Related Art

Recently, various flat panel display devices having reduced weight and volume over a cathode ray tube have been developed. As the flat panel display device, there are a liquid crystal display (LCD) device, a field emission display (FED) device, a plasma display panel (PDP), an organic light emitting display (OLED) device and the like.

Among others, the organic light emitting display device displays an image using an organic light emitting diode (OLED) generating light by recombination of an electron and a hole. Such an organic light emitting display device has advantages in that it has a rapid response speed and is driven at low power consumption.

The general organic light emitting display device supplies current corresponding to data signals to the organic light emitting diode provided in each pixel using transistors formed in each pixel, and displays an image through light generated from the organic light emitting diode.

The organic light emitting display device described above includes a data driver supplying data signals to data lines, a scan driver supplying scan signals sequentially to scan lines, a light emitting control line driver supplying light emitting control signals to light emitting control lines, and a pixel unit including a plurality of pixels connected to the data lines, scan lines and light emitting control lines.

Each pixel included in the pixel unit is selected when the scan signals are supplied through the scan driver to receive the data signals from the data driver through the data lines. The pixels receiving the data signals generates light having a predetermined brightness corresponding to the data signals and displays a predetermined image. Also, the light emitting time of each pixel is controlled by the light emitting control signals supplied from the light emitting control lines through the light emitting control line driver.

In other words, the organic light emitting display device includes a plurality of drivers generating predetermined signals to transfer them to the pixel unit.

However, in the related art, there has been a disadvantage that signals output from output terminals of each driver cannot secure stable output due to the effect of parasitic capacitance generated from buffer circuits constituting the output terminals.

As the organic light emitting display device has been gradually large, the size of the output terminals of the driver, that is, the size of the buffer circuit, has been large so that the parasitic capacitance is also large to that extent, causing a problem to hinder the panel from being large.

SUMMARY OF THE INVENTION

Therefore, with respect to a driver constituting an organic light emitting display device, it is an object of the present invention to provide an organic light emitting display device securing stable output of the driver by minimizing the extent of parasitic capacitance generated from buffer to circuits provided in the drivers.

In order to accomplish the above object, according to an embodiment of the present invention, there is provided an organic light emitting display device comprising: a data driver supplying data signals to data lines; a scan driver supplying scan signals sequentially to scan lines; a light emitting control line driver supplying light emitting control signals to light emitting control lines; a metal layer for shielding an Electro-Static Discharge (ESD) formed on an upper surface of each driver; and a pixel unit including a plurality of pixels connected to the data lines, scan lines and light emitting control lines and each having an organic light emitting device having an anode electrode, an organic light emitting layer, and a cathode electrode, wherein the metal layer for shielding the ESD is formed throughout a region other than a upper region of a gate electrode of a transistor forming a buffer circuit of each of the drivers.

At this time, the metal layer for shielding the Electro-Static Discharge (ESD) is an anode electrode or a cathode electrode, and the transistors are included in the buffer circuits connected to output terminals of the respective drivers.

Also, according to another embodiment of the present invention, there is provided an organic light emitting display device comprising: a data driver supplying data signals to data lines; a scan driver supplying scan signals sequentially to scan lines; a light emitting control line driver supplying light emitting control signals to light emitting control lines; a metal layer for shielding an Electro-Static Discharge (ESD) formed on an upper surface of each driver; and a pixel unit including a plurality of pixels connected to the data lines, scan lines and light emitting control lines and each having an organic light emitting device constituting an anode electrode, an organic light emitting layer, and a cathode electrode, wherein a buffer circuit of each of the drivers includes at least one transistor, and a source or drain electrode of the transistor is extended to an upper surface of the gate electrode in order to minimize an overlapping region of the gate electrode of the transistor and the metal layer for shielding the Electro-Static Discharge (ESD).

Also, the metal layer for shielding the Electro-Static Discharge (ESD) is an anode electrode or a cathode electrode.

With the present invention, for the driver constituting the organic light emitting display device, there is an advantage that the stable output of the driver can be secured by minimizing the size of parasitic capacitance generated form buffer circuits provided in the drivers.

BRIEF DESCRIPTION OF THE DRAWINGS

A more complete appreciation of the present invention, and many of the attendant advantages thereof, will become readily apparent as the same becomes better understood by reference to the following detailed description when considered in conjunction with the accompanying drawings in which like reference symbols indicate the same or similar components, wherein.

DETAILED DESCRIPTION OF PREFERRED EMBODIMENTS

Figure 1:
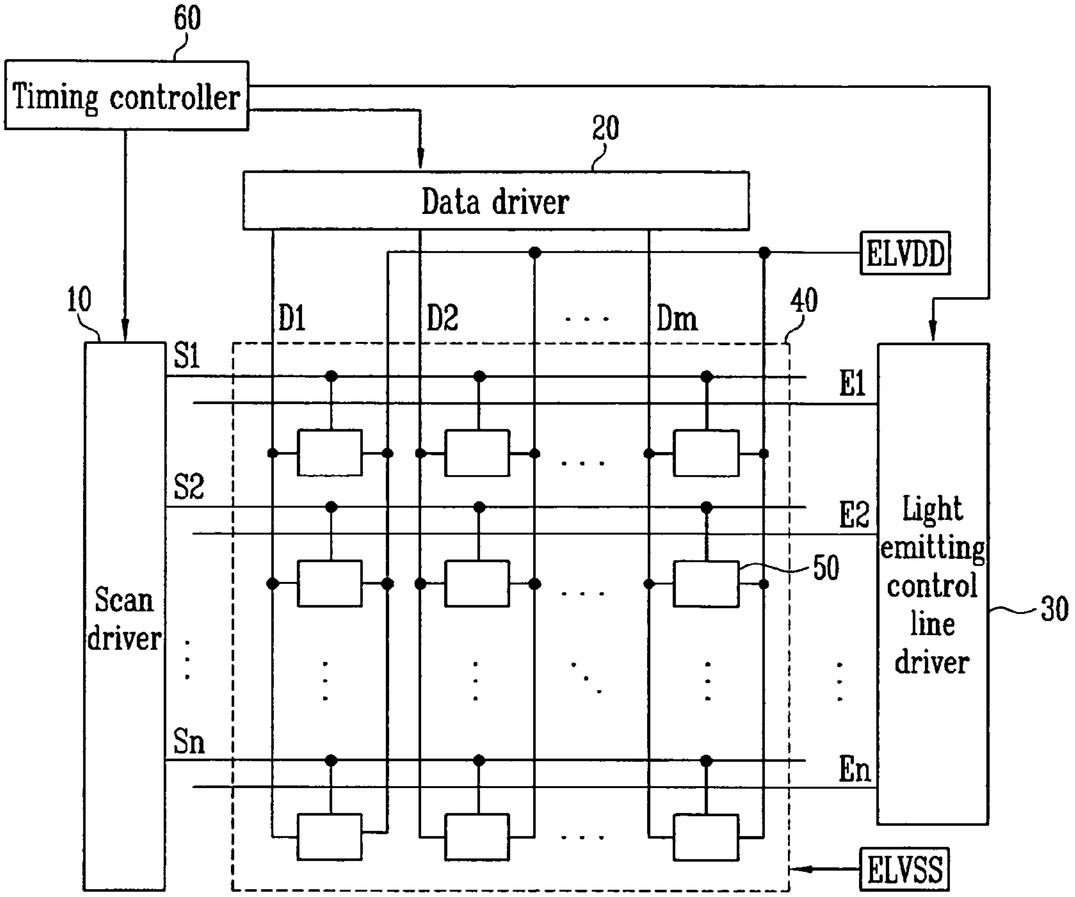
FIG. 1 is a configuration block diagram of an organic light emitting display device according to an embodiment of the present invention.

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. In addition, when an element is referred to as being "on" another element, it can be directly on the element or be indirectly on the element with one or more intervening elements interposed therebetween. Also, when an element is referred to as being "connected to" another element, it can be directly connected to the element or be indirectly connected to the element with one or more intervening elements interposed therebetween. Hereinafter, like reference numerals refer to like elements.

FIG. 1 is a configuration block diagram of an organic light emitting display device according to an embodiment of the present invention.

Although a scan driver 10 and a light emitting control line driver 30 are shown to be separated from each other in FIG. 1, this is nothing but an embodiment and the light emitting control line driver 30 may be included in the scan driver 10.

Referring to FIG. 1, the organic light emitting display device includes a pixel unit 40 including a plurality of pixels 50 connected to scan lines S1 to Sn, data lines D1 to Dm, and light emitting control lines E1 to En, a scan driver 10 driving the scan lines S1 to Sn, a data driver 20 driving the data lines D1 to Dm, a light emitting control line driver 30 driving the light emitting control lines E1 to En, a first power supply ELVDD, a second power supply ELVSS, and a timing controller 60 controlling the scan driver 10, the data driver 20, and the light emitting control line driver 30.

The scan driver 10 serves to supply the scan signals sequentially to the scan lines S1 to Sn, while being controlled by the timing controller 60, and the pixels 50 connected to the scan lines S1 to Sn through the scan signals output by the scan driver are selected sequentially.

The data driver 20 serves to supply the data signals to the data lines D1 to Dm, while being controlled by the timing controller 60. At this time, the data driver 20 supplies the data signals to the data lines D1 to Dm whenever the scan signals are supplied to each pixel 50. Thereby, the data signals are supplied to the pixels 50 selected by the scan signals, and the pixels 50 each are charged with predetermined voltage corresponding to the data signals supplied to themselves.

The light emitting control line driver 30 supplies the light emitting control signals to the light emitting control signals E1 to En, while being controlled by the timing controller 60. The light emitting control line driver 30 supplies the light emitting control signals so that the pixels 50 do not emit light while the data signals are supplied to each pixels 50, and if the charge of voltage corresponding to the data signals is completed, each pixel 50 generates light having brightness corresponding to the data signals while the light emitting control signals are not supplied.

As described above, the organic light emitting display device includes a plurality of drivers to (scan driver, data driver, and light emitting control line driver) generating each signal (scan signal, data signal, and light emitting control signal) to transfer it to the pixel unit 40.

However, in the related art, there has been a disadvantage that signals output from output terminals of each driver cannot secure stable output due to the effect of parasitic capacitance generated from buffer circuits constituting the output terminals.

In particular, a stable output from a driver is mainly resulted from that among an anode electrode, an organic light emitting layer, and a cathode electrode constituting an organic light emitting device provided in each pixel 50, the anode electrode or the cathode electrode is formed on an upper surface of the driver in order to prevent static electricity which may be unexpectedly applied to the driver, that is, in order to function as a shield of an Electro-Static Discharge (ESD).

As the organic light emitting display device gradually increases in size, the number of output terminals of the driver, that is, the size of the buffer circuit, has been large so that the parasitic capacitance is also large to that extent, causing a problem to hinder the panel from being large.

The present invention is characterized by minimizing an overlapping region of a gate electrode of a transistor forming a buffer circuit and a metal layer overlapped therewith (e.g., an anode electrode or a cathode electrode provided for a shield of an Electro-Static Discharge (ESD)), in order to minimize the size of parasitic capacitance generated in the buffer circuit provided in the driver.

In other words, the metal layer provided on the overlapping region with the gate electrode of the transistor provided in the output terminal of the driver may be removed, or a source electrode or a drain electrode is extended to an upper region of the gate electrode so that the overlapping region of the metal layer and the gate electrode is minimized.

Figure 2:
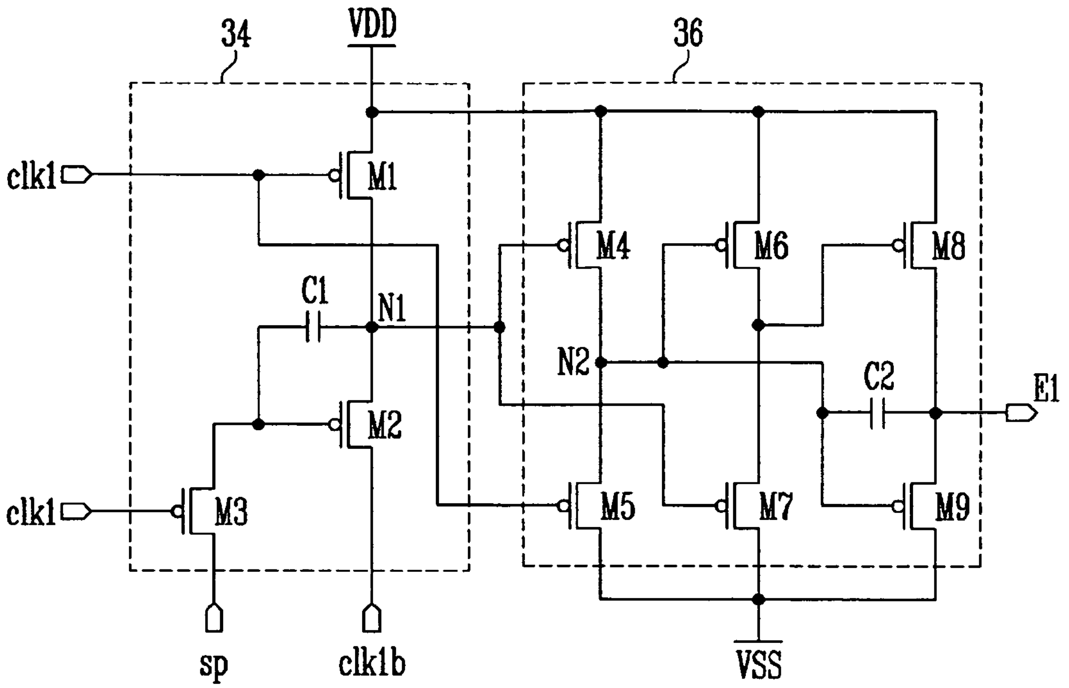
FIG. 2 is a detailed circuit diagram implementing the light emitting control line driver of FIG. 1.

FIG. 2 is a detailed circuit diagram implementing the light emitting control line driver of FIG. 1.

For the convenience of explanation, a portion of the light emitting control line driver outputting light emitting control signals using one output line, that is, using one light emitting control line, is shown.

Referring to FIG. 2, the light emitting control line driver includes an input unit 34 supplying any one of a first signal and a second signal by means of clock signals Clk1 and Clk1*b* and a start signal SP, and an output unit 36 controlling whether light emitting control signals are generated corresponding to the first signal and second signal supplied from the input unit 34. At this time, the clock signal Clk1*b* is an inverted signal of the clock signal Clk1.

The input unit 34 includes a first transistor M1 connected to a first voltage VDD and a first input terminal, a third transistor M3 connected to a second input terminal and a fourth input terminal, and a second transistor M2 connected to the third transistor M3 and a third input terminal, and a first capacitor C1 between a gate electrode and a first electrode (source electrode) of the second transistor M2.

A first electrode (source electrode) of the first transistor M1 is connected to the first voltage VDD, and a gate electrode thereof is connected to a first input terminal. A second electrode (drain electrode) of the first transistor M1 is connected to the first node N1. Such a first transistor M1 is turned on when a first clock signal Clk1 is supplied to the first input terminal to supply voltage of the first voltage VDD to the first node N1.

The first electrode (source electrode) of the second transistor M2 is connected to the first node N1, and a second electrode (drain electrode) is connected to a third input terminal. A gate electrode of the second transistor M2 is connected to a first electrode of the third transistor M3. The second transistor M2 is turned on or turned off corresponding to voltage charged in the first capacitor C1. Here, the third input terminal is supplied with the inverted second clock signal Clk1*b*.

The first electrode of the third transistor M3 is connected to the gate electrode of the second transistor M2, and a second electrode thereof is connected to the fourth input terminal. A gate electrode of the third transistor M3 is connected to the second input terminal. The third transistor M3 is turned on when the first clock signal Clk1 is supplied to the second input terminal.

The first capacitor C1 is connected between the gate electrode and the first electrode of the second transistor M2. Such a first capacitor C1 charges voltage capable of turning on the second transistor M2 when the third transistor M3 is turned on and the start signal Sp is supplied to the fourth input terminal, and does not charge voltage in other cases.

The output unit 36 outputs the light emitting control signals when a second signal (low level) applied to the first node N1 is supplied, and does not output the light emitting control signals when a first signal (high level) is supplied to the first node N1.

To this end, the output unit 36 includes a fourth transistor M4, a sixth transistor M6 and an eight transistor M8 connected to the first voltage VDD, a fifth transistor M5, a seventh transistor M7 and a ninth transistor M9 connected to the second voltage VSS, and a second capacitor C2 connected between a gate electrode and a first electrode of the ninth transistor M9.

In particular, the eighth transistor M8 and ninth transistor M9 function as buffer circuits to of the output terminals.

A first electrode of the fourth transistor M4 is connected to a first voltage VDD, and a second electrode thereof is connected to a second node N2. A gate electrode of the fourth transistor M4 is connected to the first node N1.

A first electrode of the fifth transistor M5 is connected to the second node N2 and a second electrode thereof is connected to the second voltage VSS. A gate electrode of the fifth transistor M5 is supplied with the first clock signal Clk1.

A first electrode of the sixth transistor M6 is connected to the first voltage VDD, and a second electrode thereof is connected to a first electrode of the seventh transistor M7. A gate electrode of the sixth transistor M6 is connected to the second node N2.

A first electrode of the seventh transistor M7 is connected to the second electrode of the sixth transistor M7, and a second electrode thereof is connected to the second voltage VSS. A gate electrode of the seventh transistor M7 is connected to the first node N1.

A first electrode of the eighth transistor M8 is connected to the first voltage VDD, and a second electrode thereof is connected to a light emitting control line E. A gate electrode of the eight transistor M8 is connected to the second electrode of the sixth transistor M6.

A first electrode of the ninth transistor M9 is connected to the light emitting control line E, and a second electrode thereof is connected to the second voltage VSS. A gate electrode of the ninth transistor M9 is connected to the second node N2.

The second capacitor C2 is connected between the gate electrode and the first electrode of the ninth transistor M9. Such a second capacitor C2 controls the turn-on and turn-off of the ninth transistor M9.

In the case of the light emitting control line driver having the constitution described above, all the transistors are constituted having PMOS so that they can be mounted directly, having advantages capable of reducing size, weight and manufacturing costs of the panel.

However, in the case of the buffer circuit implementing the output terminal of the driver as described above, the gate electrode of the transistor implementing the buffer circuit has the overlapping region with the metal layer formed over the upper part of the driver for the shield of the Electro-Static Discharge (ESD), that is, the anode electrode or the cathode electrode to cause parasitic capacitance. Thereby, there is a disadvantage that the output signal of the driver becomes unstable.

Figure 3A:
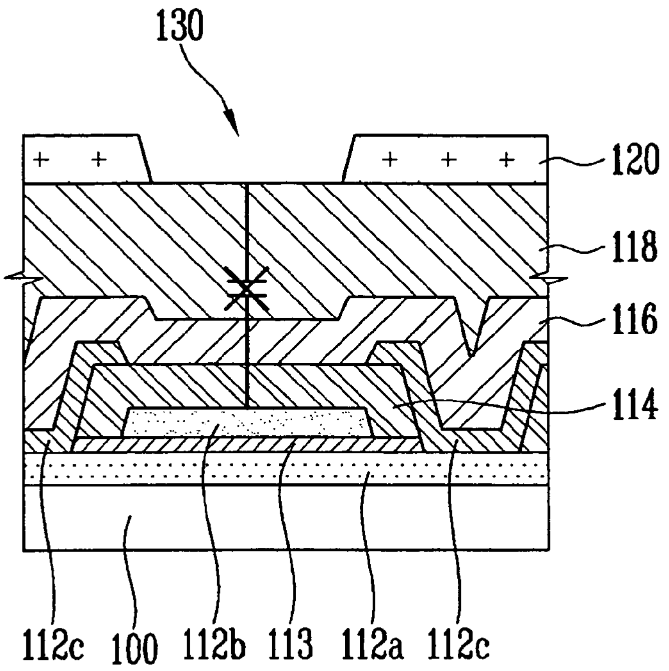
FIGS. 3A and 3B are cross-sectional views for each embodiment of a transistor region constituting a buffer region of the light emitting control line driver of FIG. 2.
Figure 3B:
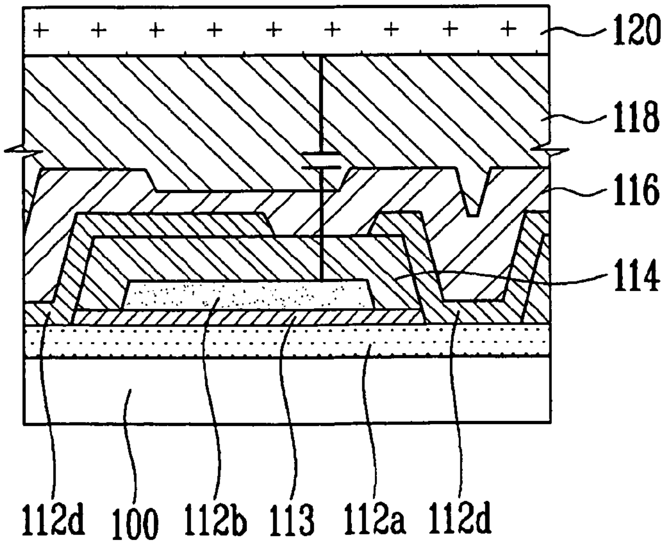

FIGS. 3A and 3B are cross-sectional views for each embodiment of a transistor region constituting a buffer region of the light emitting control line driver of FIG. 2.

FIGS. 3A and 3B are cross-sectional views of the ninth transistor M9 of the buffer circuit of FIG. 2.

First, referring to FIG. 3A, the ninth transistor M9 implementing the buffer circuit of the light emitting control line driver includes a semiconductor layer 112*a* formed on a lower substrate 100, a gate electrode 112*b* formed on the semiconductor layer 112*a* with a gate insulating film 113 being interposed there between, an interlayer dielectric film 114 formed on the gate electrode 112*b*, with source and drain electrodes 112*c* formed on the interlayer dielectric film 114 and connected to the semiconductor layer 112*a* through a contact hole in the interlayer dielectric film 114.

Also, a passivation film 116 and a planarization film 118 are stacked sequentially on the source and drain electrodes 112*c*.

A metal layer, that is, an anode electrode 120, is formed on the upper part of the planarization film 118, in order to block the Electro-Static Discharge (ESD) for the driver, as described above. At this time, the anode electrode can be replaced by a cathode electrode.

In the present embodiment, as shown in FIG. 3A, an anode electrode region 130 overlapping with the gate electrode 112*b* is removed. In other words, the anode electrode 120 is formed on a region other than the region overlapping with the gate electrode 112*b* of the transistor implementing the buffer circuit of the driver, and the anode electrode 120 is not formed on the region 130 overlapping with the gate electrode.

Accordingly, with the transistor implementing the buffer circuit of the driver described above removing the parasitic capacitance which may be formed between the gate electrode 112*b* and the anode electrode 120 overlapping with the upper part of the gate electrode 112*b*, it is possible to secure more stable output of the driver.

However, in this case, a problem arises in that manufacturing cost may be increased as a separate mask process or an etching process is added in order to remove the anode electrode 120 overlapping with the gate electrode 112*b*.

In order to overcome this problem, as another embodiment of the present invention with reference to FIG. 3B, the ninth transistor M9 implementing the buffer circuit of the light emitting control line driver includes a semiconductor layer 112*a* formed on a substrate 100, a gate electrode 112*b* formed on the semiconductor layer 112*a* with a gate insulating film 113 interposed there between, and an interlayer dielectric film 114 formed on the gate electrode 112*b*, with source and drain electrodes 112*d* formed on the interlayer dielectric film 114 and connected to the semiconductor layer 112a through a contact hole in the interlayer dielectric film 114.

Also, a passivation film 116 and a planarization film 118 are stacked sequentially on the source and drain electrodes 112d.

A metal layer 120, that is, an anode electrode (or a cathode electrode), is formed on the upper part of the planarization film 118 and over the circuit constituting the driver, in order to block the Electro-Static Discharge (ESD) for the driver, as described above.

However, in the case of the ninth transistor M9, any one of the source and drain electrodes 112d overlaps with the upper region of the gate electrode 112b, in order to minimize the overlapping region between the gate electrode 112b and the anode electrode 120.

Through the above, the parasitic capacitance generated due to the overlapping between the anode electrode 120 and the gate electrode 112b can be minimized, without performing the process of removing a portion of the anode electrode 120. Thereby, for the transistor implementing the buffer circuit of the driver, the parasitic capacitance which may be formed between the gate electrode 112b and the anode electrode overlapping with the upper part of the gate electrode 112b is removed, making it possible to secure more stable output of the driver.

Meanwhile, the present invention is not limited to the light emitting control line driver to which the present invention can be applied.

In other words, the technical idea of the present invention can be applied to the transistor regions constituting the buffer circuits included in the output terminals of the scan driver and the data driver, in addition to the light emitting control driver.

While the present invention has been described in connection with certain exemplary embodiments, it is to be understood that the invention is not limited to the disclosed embodiments, but, on the contrary, is intended to cover various modifications and equivalent arrangements included within the spirit and scope of the appended claims, and equivalents thereof.

What is claimed is:

1. An organic light emitting display device comprising:
a data driver supplying data signals to data lines;
a scan driver supplying scan signals sequentially to scan lines;
a light emitting control line driver supplying light emitting control signals to light emitting control lines;
a pixel unit including a plurality of pixels connected to the data lines, scan lines and light emitting control lines and each having an organic light emitting device; and
a metal layer for shielding an Electro-Static Discharge (ESD) formed on an upper surface of each driver, said metal layer being formed throughout a region other than a upper region of a gate electrode of a transistor forming a buffer circuit of each of the drivers.

2. The organic light emitting display device according to claim 1, wherein the metal layer for shielding the Electro-Static Discharge (ESD) is an anode electrode.

3. The organic light emitting display device according to claim 1, wherein the metal layer for shielding the Electro-Static Discharge (ESD) is a cathode electrode.

4. The organic light emitting display device according to claim 1, wherein the buffer circuits are connected to output terminals of the respective drivers.

5. The organic light emitting display device according to claim 1, wherein the upper region of the gate electrode of the transistor forming the buffer circuit is not overlapped by source and drain electrodes.

6. An organic light emitting display device comprising:
a data driver supplying data signals to data lines;
a scan driver supplying scan signals sequentially to scan lines;
a light emitting control line driver supplying light emitting control signals to light emitting control lines;
a pixel unit including a plurality of pixels connected to the data lines, scan lines and light emitting control lines and each having an organic light emitting; and
a metal layer for shielding an Electro-Static Discharge (ESD) formed on an upper surface of each driver, said metal layer being formed throughout a region over an upper region of a gate electrode of a transistor forming a buffer circuit of each of the drivers, wherein the upper region of the gate electrode of the transistor forming the buffer circuit is overlapped by one of a source electrode or a drain electrode.

7. The organic light emitting display device according to claim 6, wherein the metal layer for shielding the Electro-Static Discharge (ESD) is an anode electrode.

8. The organic light emitting display device according to claim 6, wherein the metal layer for shielding the Electro-Static Discharge (ESD) is a cathode electrode.

9. The organic light emitting display device according to claim 6, wherein the buffer circuits are connected to output terminals of the respective drivers.

10. An organic light emitting display device comprising:
a data driver supplying data signals to data output lines;
a scan driver supplying scan signals sequentially to scan output lines;
a light emitting control line driver supplying light emitting control signals to light emitting control output lines;
a pixel unit including a plurality of pixels connected to the output lines of said data driver, said scan driver and said light emitting control line driver, at least one of said data driver, said scan driver and said light emitting control line driver having a buffer circuit disposed at each output line; and
each said buffer circuit comprising a transistor having a gate layer, source and drain layers and a metal layer for shielding an Electro-Static Discharge (ESD), each said buffer circuit further comprising:
said metal layer being formed over said gate layer when the gate layer is overlapped by one of said source or a drain electrodes; or
said metal layer being formed to not overlap said gate layer when the gate layer is not overlapped by said source or a drain electrodes.

11. The organic light emitting display device according to claim 10, wherein each of said data driver, said scan driver and said light emitting control line driver comprise said buffer circuits disposed at each output line.

12. The organic light emitting display device according to claim 10, wherein the metal layer for shielding the Electro-Static Discharge (ESD) is a cathode electrode.

13. The organic light emitting display device according to claim 10, wherein the metal layer for shielding the Electro-Static Discharge (ESD) is an anode electrode.

* * * * *